US007688737B2

(12) United States Patent
Archer et al.

(10) Patent No.: US 7,688,737 B2
(45) Date of Patent: Mar. 30, 2010

(54) LATENCY HIDING MESSAGE PASSING PROTOCOL

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/682,057

(22) Filed: Mar. 5, 2007

(65) Prior Publication Data

US 2008/0222303 A1    Sep. 11, 2008

(51) Int. Cl.
*H04J 1/16* (2006.01)

(52) U.S. Cl. .................................. 370/236; 370/474

(58) Field of Classification Search ................ 709/238; 370/351–356, 389, 236, 474
See application file for complete search history.

(56) References Cited

U.S. PATENT DOCUMENTS 5,105,424 A * 4/1992 Flaig et al. ................. 709/243
6,349,210 B1 * 2/2002 Li ............................. 455/450
2004/0103218 A1 * 5/2004 Blumrich et al. ............ 709/249
2005/0169232 A1 * 8/2005 Sakoda et al. ............... 370/347
2006/0268797 A1 * 11/2006 Cheng et al. ................ 370/338
2006/0268803 A1 * 11/2006 Lee et al. .................... 370/338
2007/0036170 A1 * 2/2007 Gonikberg et al. .......... 370/431

OTHER PUBLICATIONS

"Design and Implementation of a One-Sided Communication Interface for the IBM eServer Blue Gene Supercomputer", http://sc06.supercomputing.org/techprogram/papers.php/, publicly available Aug. 2006.

* cited by examiner

*Primary Examiner*—Kwang B Yao
*Assistant Examiner*—Jung Liu
(74) *Attorney, Agent, or Firm*—Patterson & Sheridan, LLP

(57) ABSTRACT

A method, system, and article of manufacture that provide latency hiding, high bandwidth message passing protocols used for data communication between nodes of a parallel computer system are disclosed. A source node transmits a request to send message to a receiving node. Prior to receiving a clear to send message, the sending node continues to send deterministically routed (or fully described) data packets to the receiving node, thereby hiding the latency inherent in the request to send—clear to send message exchange. Once the sending node receives the clear to send message, any remaining portion of the message may be sent using partially described packets which may be routed dynamically, thereby maximizing bandwidth.

12 Claims, 8 Drawing Sheets

LATENCY HIDING MESSAGE PASSING PROTOCOL

BACKGROUND OF THE INVENTION

1. Field of the Invention

The present invention generally relates to parallel computing. More specifically, the present invention relates to a low latency, high bandwidth, message passing protocol for use in a parallel computer system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

IBM is currently developing a successor to the Blue Gene/L system, named Blue Gene/P. Blue Gene/P is expected to be the first computer system to operate at a sustained 1 petaflops (1 quadrillion floating-point operations per second). Like the Blue Gene/L system, the Blue Gene/P system is scalable with a projected maximum of 73,728 compute nodes. Each compute node in Blue Gene/P is projected to include a single application specific integrated circuit (ASIC) with 4 CPU's and memory. A complete Blue Gene/P system is projected to include 72 racks with 32 node boards per rack.

In addition to the Blue Gene architecture developed by IBM, other highly parallel computer systems have been (and are being) developed. For example, a Beowulf cluster may be built from a collection of commodity off-the-shelf personal computers. In a Beowulf cluster, individual systems are connected using local area network technology (e.g., Ethernet) and system software is used to execute programs written for parallel processing on the cluster of individual systems.

The compute nodes in a parallel system communicate with one another over one or more communication networks. For example, the compute nodes of a Blue Gene/L system are interconnected using five specialized networks, and the primary communication strategy for the Blue Gene/L system is message passing over a torus network (i.e., a set of point-to-point links between pairs of nodes). This message passing allows programs written for parallel processing to use high level interfaces such as Message Passing Interface (MPI) and Aggregate Remote Memory Copy Interface (ARMCI) to perform computing tasks and to distribute data among a set of compute nodes. Other parallel architectures (e.g., a Beowulf cluster) also use MPI and ARMCI for data communication between compute nodes. Low level network interfaces communicate higher level messages using small messages known as packets. Typically, MPI messages are encapsulated in a set of packets which are transmitted from a source node to a destination node over a communications network (e.g., the torus network of a Blue Gene system).

A "message passing protocol" is a set of instructions specifying how to construct a message from a packet stream. Message passing protocols can transmit packets in different ways depending on the desired communication characteristics. Additionally, packets may be "fully described" in which part of the packet payload stores metadata describing the message or "partially described" in which most packet metadata is omitted from individual packets. Fully described packets may be transmitted at any time, and may be routed dynamically. In contrast, partially described packets require a communication context to be previously established between a message sender and receiver.

On both a Blue Gene system and other parallel computing systems, low latency messaging is often implemented using a low latency protocol (sometimes called eager messages) and high bandwidth messaging is implemented using a high bandwidth protocol (sometimes called rendezvous messages). Which message passing protocol is used may depend on cutoffs based on message size.

To achieve low message latency, a low latency protocol may specify to send a fully described initial packet followed by partially described data packets and to route all packets deterministically to maintain packet order. Alternatively, such a protocol may specify to send only fully described packets and to route the packets dynamically. In either case, the low latency protocol provides a low bandwidth due to the requirement that all packets be fully (or partially) described. This requirement limits the amount of message data that may be included in each individual packet. Further, because deterministically routed packets each take the same route form a source to a destination, there is no opportunity to "route around" any congested network segments.

In contrast, to achieve high message bandwidth, a message passing protocol may specify to transmit partially described packets and to have packets routed dynamically. This protocol maximizes both the amount of data to be transmitted as well the number of packets transmitted per unit time. However, the high bandwidth protocol requires a communication context be initialized between a source and destination node before the high level message (e.g., an MPI message) is sent. Typically, to establish the communication context, a source node transmits a "request to send" packet to destination node. In response, the destination node sets up a communication context for the message and returns a "clear to send" message to the source node. During this initialization, no data packets are sent. Thus, high bandwidth protocols provide limited latency, as the communication context needs to be initialized before any data packets containing the actual message are transmitted.

While each of these message passing protocols function as intended, maintaining both protocols requires separate code bases, multiplying the code that must be created, debugged and maintained. Further, it is often desirable to have messages transmitted in both a low latency, high bandwidth manner, particularly in a highly parallel computing system where even very small amounts of overhead can have a substantial impact on program performance.

Accordingly, there remains a need for a latency hiding message passing protocol that provides both low latency and high bandwidth characteristics for passing messages between nodes of a parallel computing system.

SUMMARY OF THE INVENTION

Embodiments of the invention provide a message passing protocol that achieves both low latency and high bandwidth from a single protocol. Advantageously, because there is a single code path to maintain, the benefits of rendezvous and eager messages may be realized.

Embodiments of the invention include a method of transmitting a message from a sending node to a receiving node of a parallel computing system. The method generally includes encapsulating the message within a set of one or more data packets, transmitting a request to send (RTS) message from the sending node to the receiving node, and prior to receiving a clear to send (CTS) message at the sending node, transmitting one or more of the data packets to the sending node. The method also includes, upon receiving the CTS message at the sending node, transmitting any remaining packets of the set of one or more packets to the receiving node, whereby the message is transmitted from the sending node to the receiving node.

Embodiments of the invention also include a computer-readable storage medium containing a program which, when executed, performs an operation for transmitting a message from a sending node to a receiving node of a parallel computing system. The operation generally includes encapsulating the message within a set of one or more data packets, transmitting a request to send (RTS) message from the sending node to the receiving node, and prior to receiving a clear to send (CTS) message at the sending node, transmitting one or more of the data packets to the sending node. The operation also includes, upon receiving the CTS message at the sending node, transmitting any remaining packets of the set of one or more packets to the receiving node, whereby the message is transmitted from the sending node to the receiving node.

Embodiments of the invention also include a parallel computing system having a plurality of compute nodes, each having at least one processor and a memory, wherein a sending node, of the plurality of compute nodes, is configured to transmit a message to a receiving node, of the plurality of compute nodes. The operation of sending the message from the sending node to the receiving node generally includes encapsulating the message within a set of one or more data packets, transmitting a request to send (RTS) message from the sending node to the receiving node, and prior to receiving a clear to send (CTS) message at the sending node, transmitting one or more of the data packets to the sending node. The operation generally further includes upon receiving the CTS message at the sending node, transmitting any remaining packets of the set of one or more packets to the receiving node, whereby the message is transmitted from the sending node to the receiving node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. Note, however, the appended drawings illustrate typical embodiments of the invention and are therefore not to be considered limiting of its scope, for the invention may admit to other equally effective embodiments.

DETAILED DESCRIPTION OF THE PREFERRED EMBODIMENTS

Figure 1:
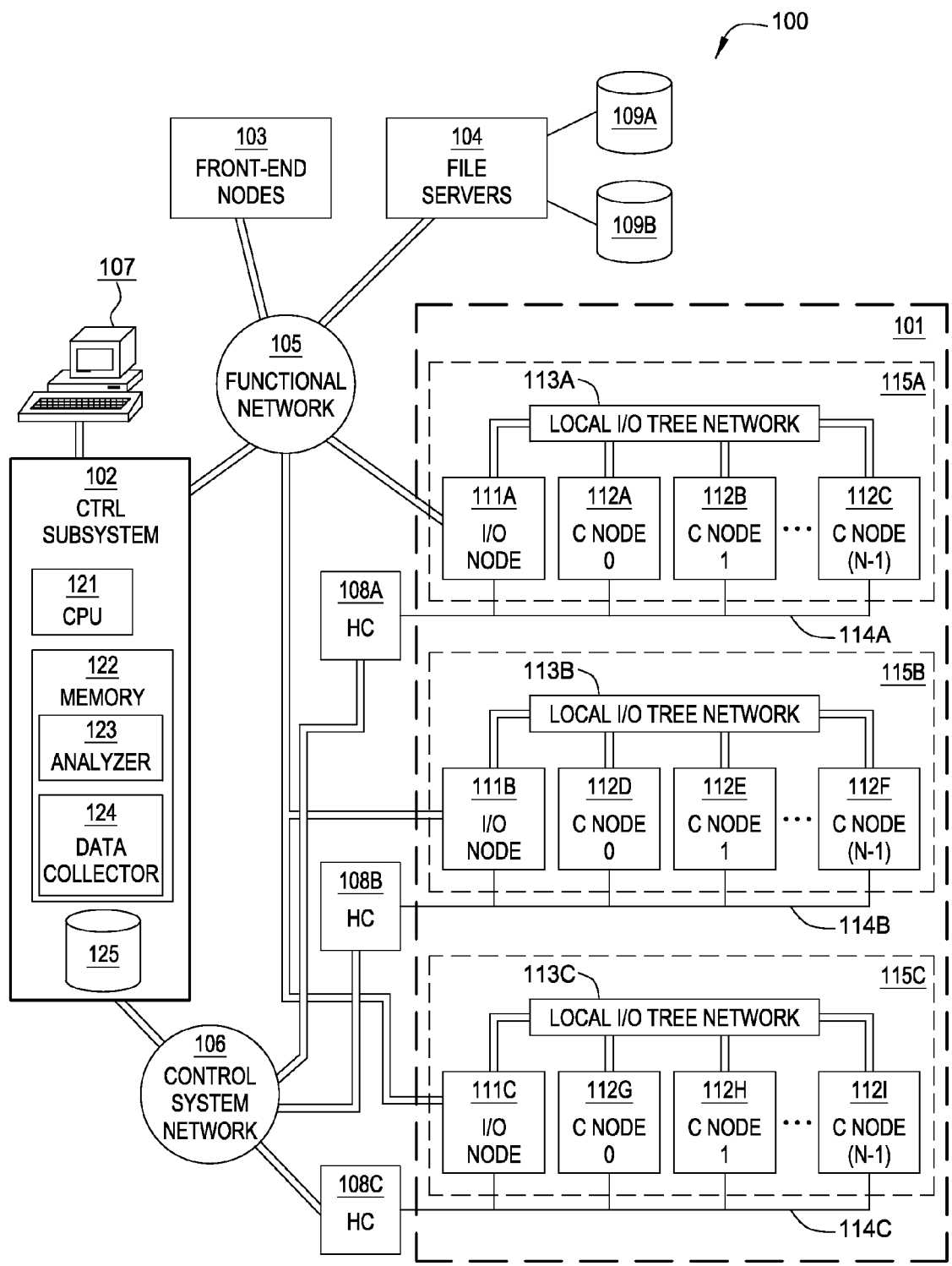
FIG. 1 is a high-level block diagram of components of a massively parallel computer system, according to one embodiment of the present invention.

Embodiments of the invention include a method, system, and article of manufacture that provide latency hiding, high bandwidth, message passing protocols used for data communication between nodes of a parallel computer system. In one embodiment, an initial fully described data packet received at a destination node is interpreted as an implicit "request to send" (RTS) message from a sending node. While the source node waits for a "clear to send" (CTS) message from the destination node (indicating that a communication context has been established between the nodes), the source node continues to send a message using partially described, deterministically routed packets (minimizing latency). Because the packets are routed deterministically, the messages arrive in order at the destination node. Alternatively, instead of sending deterministically routed, partially described packets while waiting for the CTS message, the sending node may be configured to send dynamically routed, fully described packets. In such a case, even when packets arrive out of order, because they are fully described, the receiving node may reconstruct the correct packet sequence. Once the source node receives the CTS message, any remaining portion of the message may be sent using partially described packets and may route such packets dynamically (maximizing bandwidth).

One difference between the message passing protocol described herein and a conventional low latency protocol is that the low latency protocol is limited to sending deterministically routed packets (limiting the maximum bandwidth and subject to congestion problems), where embodiments of the invention may be used to send dynamically routed packets once a communication context is established between nodes. One difference between this protocol and a conventional high bandwidth protocol is that the high bandwidth protocol requires a communication context to be established before any data packet can be sent from the source node (increasing message latency), where the protocol described herein specifies that a communication context only needs to be established before any dynamically routed data packets are received at the destination node.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is a computer that includes a processor (or processors) 121, internal memory 122, and local storage 125. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 111, and perform diagnostic and maintenance functions.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
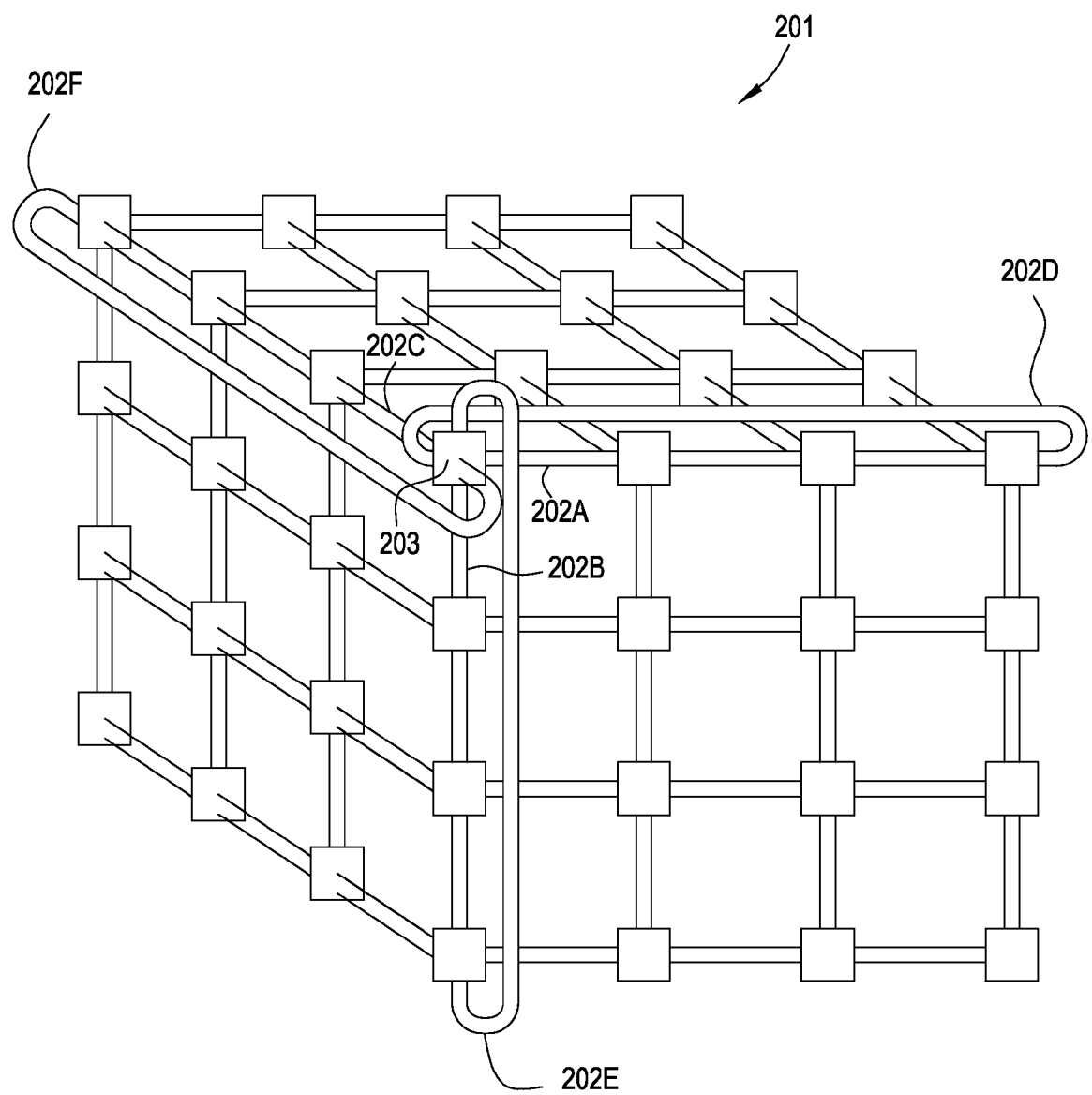
FIG. 2 is a conceptual illustration of a three dimensional torus network of the system of FIG. 1, according to one embodiment of the invention.

In one embodiment, compute nodes 112 are arranged logically in a three-dimensional torus, where each compute node may be identified using an x, y and z coordinate. FIG. 2 is a conceptual illustration of a three-dimensional torus network of system 100, according to one embodiment of the invention.

More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. Each compute node in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from a last node in the x, y and z dimensions to a first node. Thus, although node 203 appears to be at a "corner" of the torus, node-to-node links 202A-F link node 203 to nodes 202D, 202E, and 202F, in the x, y, and Z dimensions of torus 201.

By passing a message from node to node, each compute node can send a message to any other node across a 3D torus network. Generally, message packets may be deterministically routed or dynamically routed. When a node sends a packet using a deterministic routing strategy, the packet is routed to the correct x dimension, then the correct y dimension, and lastly the last z dimension. In other words, the routing path between any two nodes will always follow the same static route. Thus, packets are assured to arrive in order at a destination node. In contrast, when a node sends a packet using a dynamic routing strategy, a determination is made at each compute node between the source and destination regarding which path to transmit the packet. Generally, packets are routed so that they travel down the least congested network path from any given node. Thus, packets may arrive at the destination node out of order when network activity changes as a message is being sent.

Figure 3:
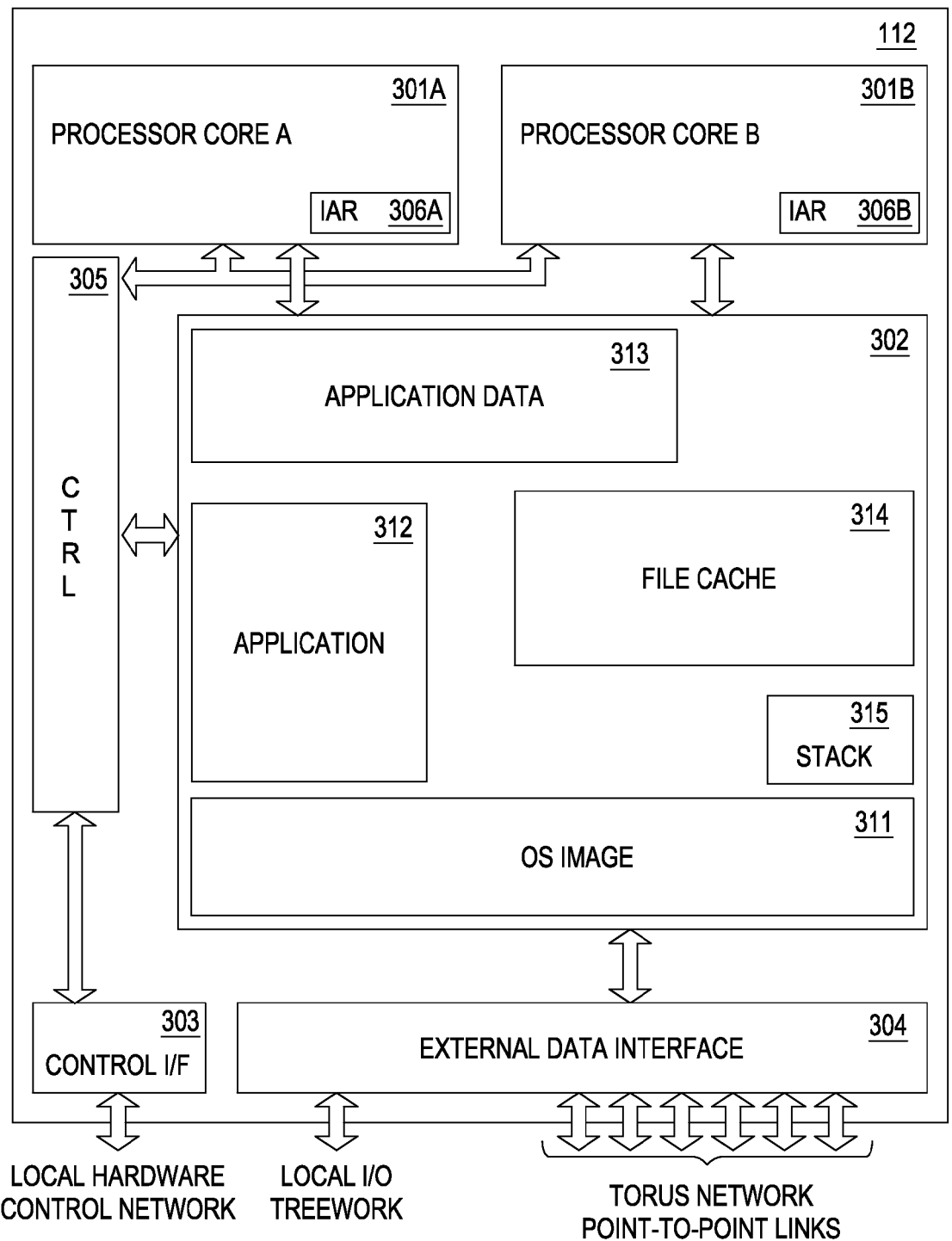
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a Blue Gene system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries.)

Application code image 312 represents a copy of the application code being executed by compute node 112. Application code image 302 may include a copy of a computer program being executed by system 100, but where the program is very large and complex, it may be subdivided into portions which are executed by different compute nodes 112. Memory 302 may also include a call-return stack 315 for storing the states of procedures which must be returned to, which is shown separate from application code image 302, although in may be considered part of application code state data.

As part of ongoing operations, application 312 may transmit messages from compute node 112 to other compute nodes in parallel system 100. For example, the high level MPI call of MPI_Send( ); may be used by application 312 to transmit a message from one compute node to another. On the other side of the communication, the receiving node may call use the MPI call MPI_Recieve( ); to receive and process the message. As described above, in a Blue Gene system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a using a high-speed Ethernet style network.

Figure 4:
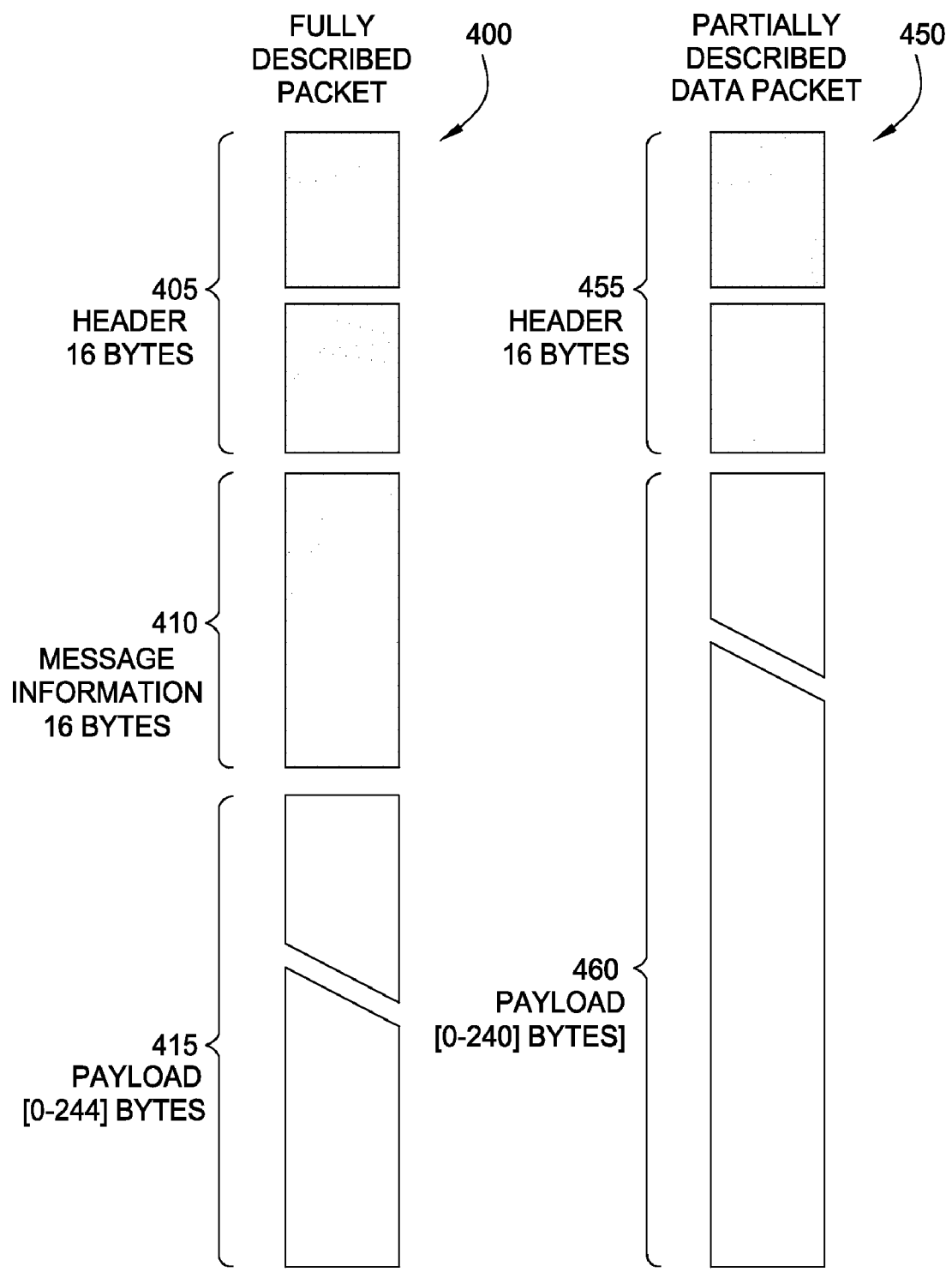
FIG. 4 is a block diagram illustrating low-level data packet structure, according to one embodiment of the invention.

FIG. 4 is a block diagram illustrating data packet structures used to transmit a message between compute nodes of a parallel computing system, according to one embodiment of the invention. As shown, FIG. 4 illustrates a fully described data packet layout 400 and a partially described data packet 450. Both layouts may be used to generate packets transmitted over the point-to-point torus network of the Blue Gene system (e.g., torus 201). As defined for the Blue Gene system, each data packet may store a maximum of 256 bytes. Every bit not used for program data contributes to lost bandwidth. Because of the parallel architecture of a Blue Gene system (and other parallel systems) the impact of small amounts of overhead in individual communications are magnified and can become a significant drain on system resources. Packet layouts 400 and 450 are configured to maximize the bandwidth which may be from a payload standpoint. In the case of a Blue Gene system, the data packets may include a maximum payload of 240 bytes. Of course, in other communication schemes the maximum packet size, as well as the exact allocation of bytes between headers, message metadata, and payload may vary.

Illustratively, fully described data packet layout 400 includes a header 405, message specific information 410 and a payload 415. The header 405 may include a packet type, payload size, data type, and other information used by the network hardware in transmitting the packet from a source node to a destination node. Message information 410 may include information related to the specific message (e.g., an MPI message) encapsulated in a set of packets. Message information 410 may be used by a receiving node to reconstruct the message encapsulated in a set of packets, regardless of the order in which the packets arrive at the destination node and without any prior communication context having been established between the source and destination nodes.

In contrast, partially described data packet 450 includes a header 455 and a payload 460, but does not include message information 410. Thus, the payload size may be increased from a maximum of 224 bytes to 240 bytes. Without message information 410, packets constructed according to the partially described layout 450 must be routed deterministically (i.e., all packets take the same route between a source and destination, ensuring they arrive in order, but subjecting the packets to possible congestion) or the sending and receiving node must establish a communication context between one another.

Figure 5:
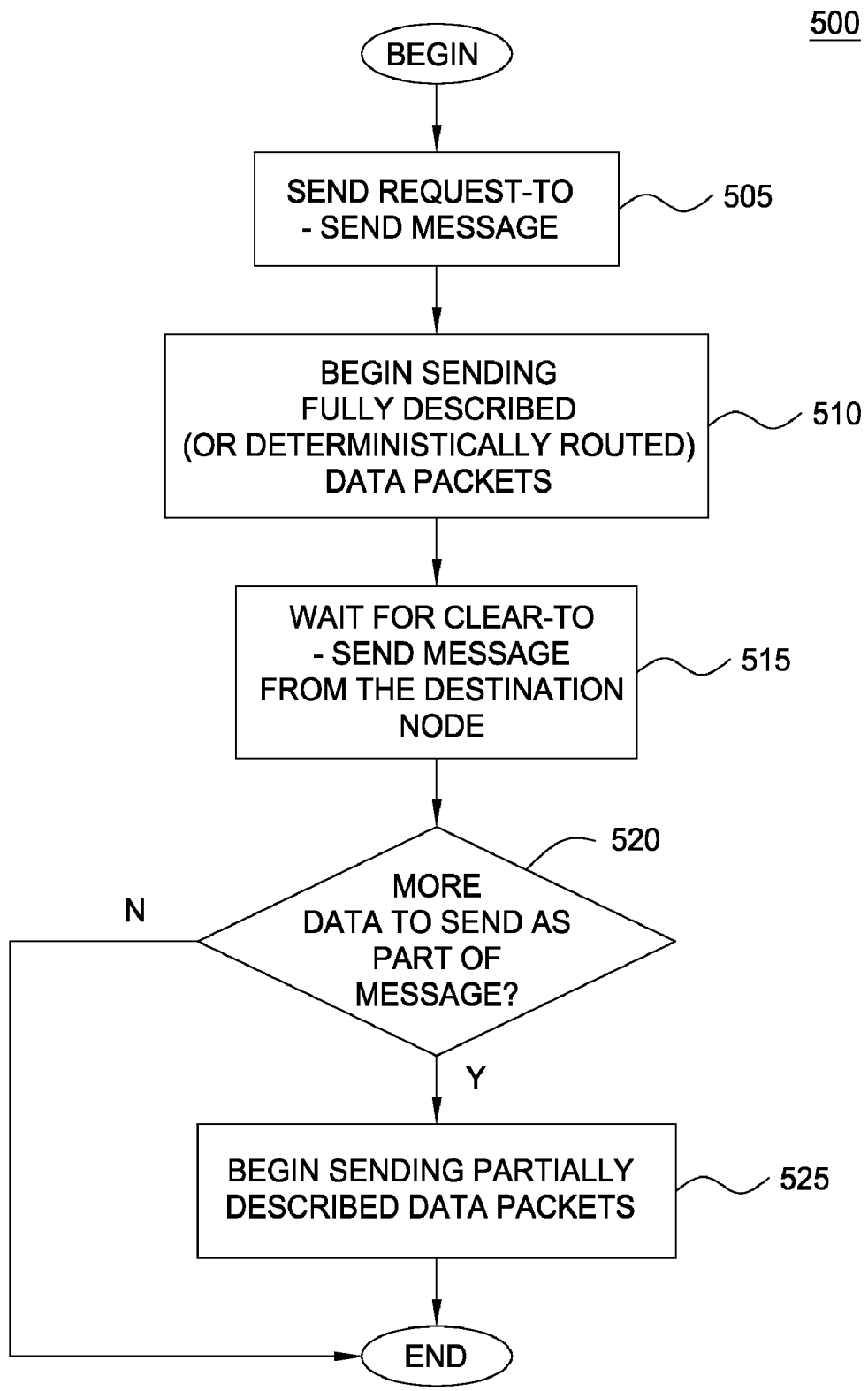
FIG. 5 is a flow diagram illustrating a latency hiding, high bandwidth, message passing protocol, according to one embodiment of the invention.

As stated, to preserve high level message ordering and to minimize latency, a protocol (the instructions for sending the packets) is important. FIG. 5 is a flow diagram illustrating a latency hiding, high bandwidth, message passing protocol 500, according to one embodiment of the invention. In one embodiment, the protocol 500 may be used to encapsulate and transmit application program messages (e.g., MPI messages) between compute nodes of a massively parallel computer system.

As shown, the protocol 500 begins at step 505 where a compute node transmits a request to send a message to a destination node. In one embodiment, the request to send a message may be an initial fully described data packet received by the destination node. That is, the RTS message may itself include a portion of message data. In the case of fully described packet 400, for example, up to 240 bytes of message data may be included in the initial packet. Alternatively, the RTS message may include only the request, and not any data associated with the high-level message to be sent. In either case, at step 510, prior to receiving a "clear to send" (CTS) message indicating that the destination has set up a communication context to receive the message, the sending node sends fully described data packets to the destination node.

In one embodiment, the fully described data packets may be routed dynamically and arrive out of order at the destination. Because the packets are fully described however, the destination node may correctly reconstruct the message encapsulated in these packets. Alternatively, the packets sent at step 510 may be partially described, but routed deterministically, ensuring that these packets arrive at the destination in sequence order. In either case, by not waiting for the CTS message, the latency of the CTS message acknowledgement is hidden because the sending node continues to send packets to the destination until the CTS message is received. Although some bandwidth is used by sending multiple fully described packets, the bytes per packet lost becomes very small compared to message size. Further, when compared with prior art techniques of not sending any message data to the destination node until the CTS message is received, embodiments of the invention achieve a more efficient use of network bandwidth.

At step 515, the sending node waits to receive a CTS message from the destination node. While waiting, the sending node continues to transmit fully described (or deterministically routed) packets to the destination. Once the CTS message is received, at step 520, the sending node determines whether more data needs to be sent as part of the message being transmitted to the destination node. If not, that is, if the complete message has been sent using fully described packets, then the protocol 500 ends. Otherwise, if portions of the message being transmitted have not been sent, then at step 525, the remaining packets are sent using partially described data packets. In other words, once the CTS message is received, the protocol 500 shifts to sending messages using high-bandwidth, partially described packets (recapturing the bytes otherwise used for message metadata). Further, the packets may be routed dynamically, and thus avoid network congestion, even though this may result in packets arriving out of order at the destination. Because the receiving node has established a communication context for the message, the receiving node may be able to order the packets correctly and to reconstruct the high level message encapsulated therein.

Figure 6A:
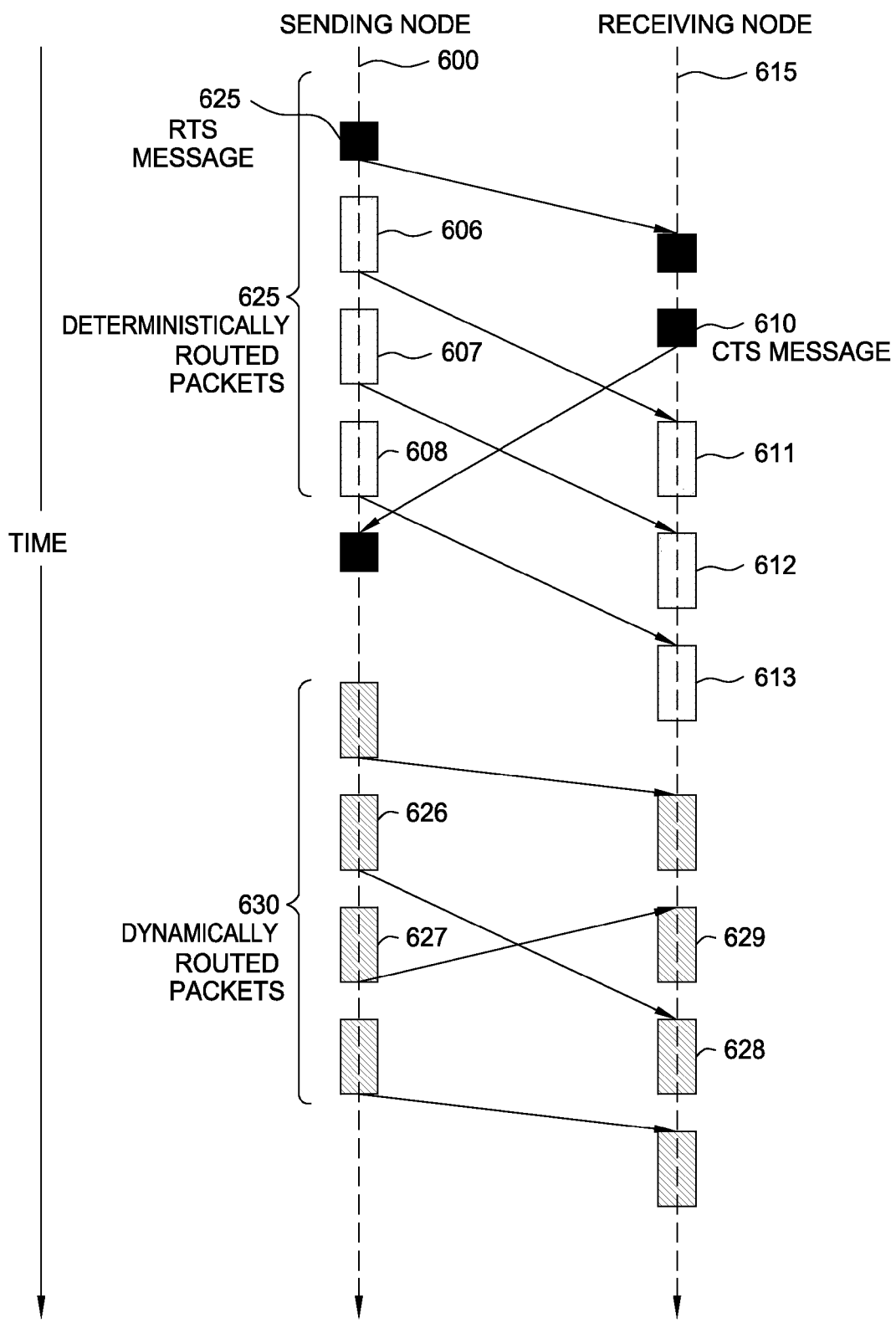
FIGS. 6A-6C are sequence diagrams illustrating a latency hiding, high bandwidth, message passing protocol used to transmit packets from a sending node to a receiving node of a parallel computer system, according to one embodiment of the invention.
Figure 6B:
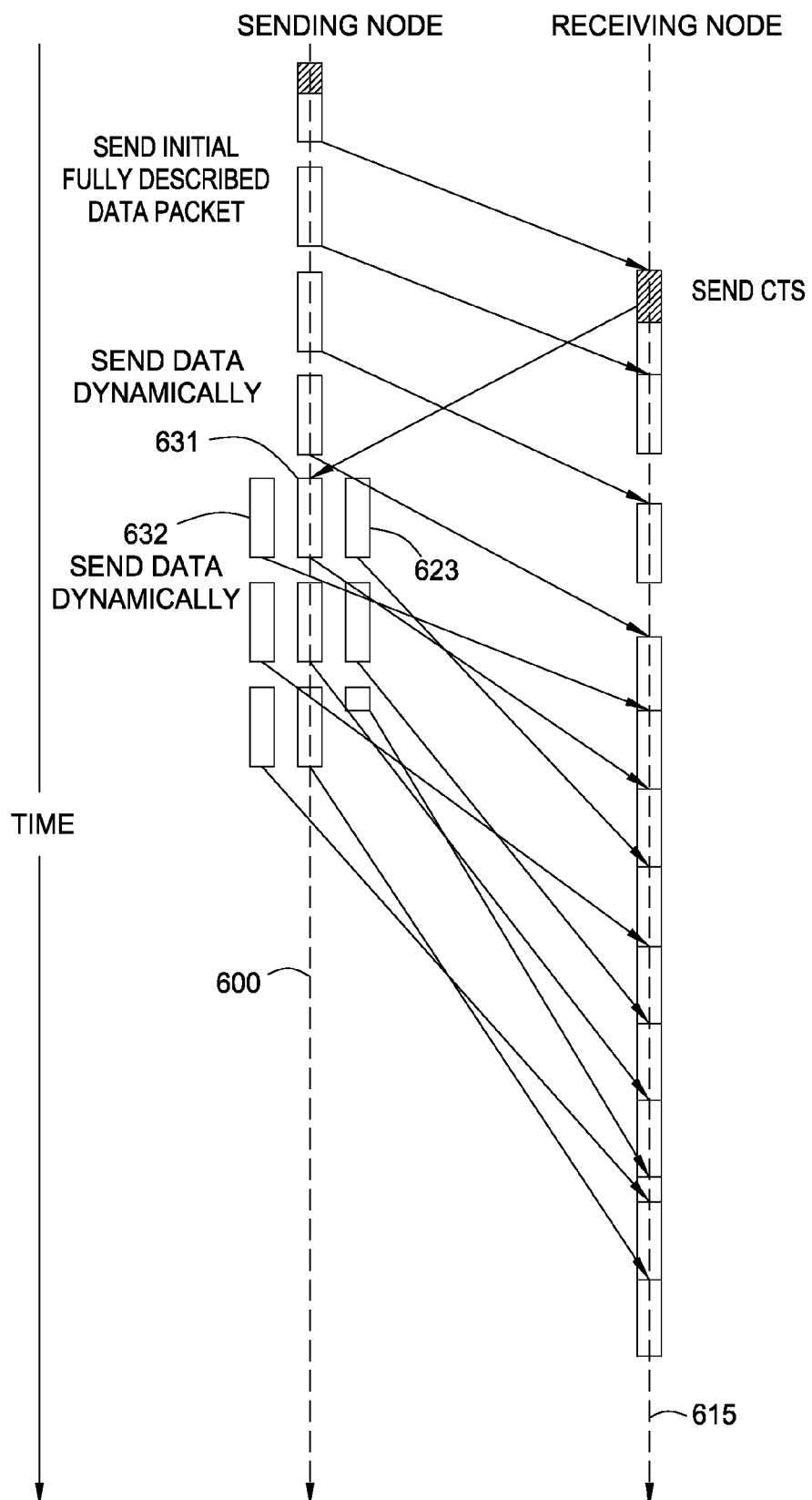
Figure 6C:
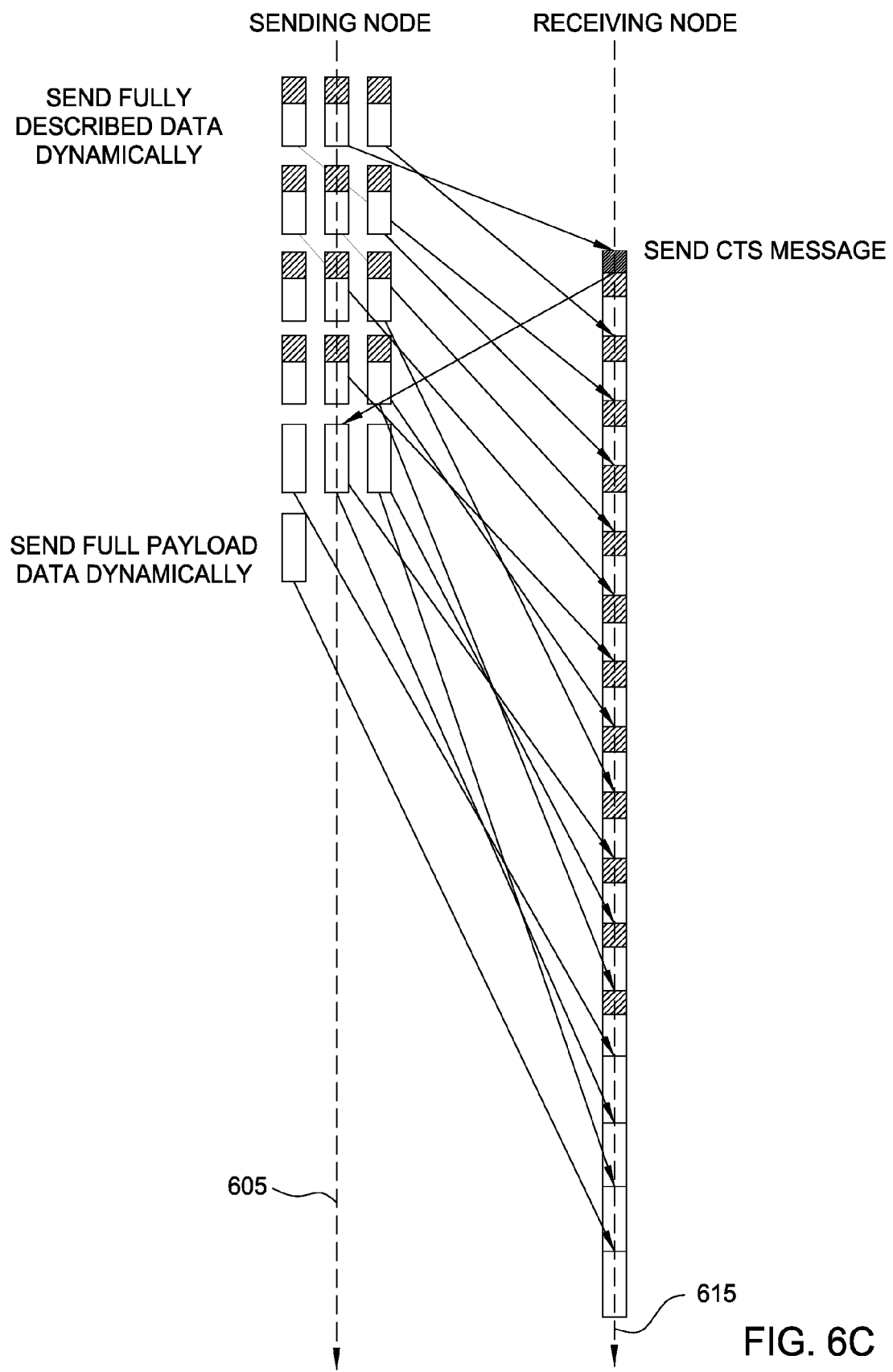

FIGS. 6A-6C are sequence diagrams illustrating variations of the latency hiding, high bandwidth message passing protocol shown in FIG. 5 being used to transmit packets from a sending node to a receiving node of a parallel computer system, according to one embodiment of the invention. As shown in FIG. 6A-6C, actions performed by the sending node are shown on axis 600 and actions performed by the receiving node are shown on axis 615.

In the example of FIG. 6A, the sending node transmits an RTS message 605 to the receiving node. As stated, in one embodiment, RTS message 605 may include only the request to establish a communication context between the sending node and the receiving node. In response, the receiving node generates a CTS message 610 and sends this message back to the sending node. In this example, prior to receiving CTS message 610, the sending node continues to send deterministically routed packets to the receiving node. Illustratively, axis 600 shows packets 606, 607, and 608 sent from the sending node, before it receives CTS message 610. Because packets 606, 607, and 608 are routed deterministically, they arrive in the sequence order at receiving node 610 (as shown by packets 611, 612, and 613 on axis 615) and may be partially described (maximizing bandwidth). That is, the packets need not include metadata describing sequence order, as deterministically routed packets arrive in the correct sequence order.

Once the CTS message is received by the sending node, subsequent packets 630 are routed dynamically, and may thus, arrive out of order at the receiving node. For example, packets 626 and 627 arrive out of sequence order, as shown by packets 629 and 628 on axis 615. However, because the communication context has been established for this message exchange, the receiving node has the information required to reorder the packets 630 correctly and to reconstruct the message being sent by the sending node.

FIG. 6B illustrates another example of the latency hiding, high bandwidth message passing protocol 500 shown in FIG. 5 being used to transmit packets from a sending node to a receiving node of a parallel computer system. In this example, rather than send a RTS message, the sending node transmits an initial fully described packet that includes a portion of message data as a packet payload (i.e., payload 415). In response, the sending node may interpret the initial fully described packet as an implicit request to establish a communication context for a message to be received from the sending node. Thus, the sending node generates a CTS message and transmits it to the sending node. Like the sequence diagram shown in FIG. 6A, prior to receiving the CTS message, the sending node continues to send deterministically routed packets, thereby hiding the latency inherent in the RTS—CTS message exchange, and once the CTS message is received by the sending node, the sending node may transmit dynamically routed packets. Additionally, in the example shown in FIG. 6B, three packets 631, 632, and 633 are transmitted by the sending node essentially simultaneously. This represents the multi-dimensional nature of the point-to-point torus network provided by the Blue Gene system, where a dynamically routed packet may be transmitted on each of the x, y, and z, network planes. Even though many of the packets arrive out of order, the communication context established by the receiving node allows it to reconstruct the original sequence, and thus, the original high-level message from these packets.

FIG. 6C illustrates another example of the latency hiding, high bandwidth message passing protocol 500 shown in FIG. 5 being used to transmit packets from a sending node to a receiving node of a parallel computer system. In this example, the sending node transmits multiple, fully described data packets, where the packets are routed dynamically. Like the example shown in FIG. 6B, the first such packet received by the receiving node is interpreted as an implicit RTS message, resulting in a CTS message being sent back to the sending node. In this example, however, the sending node sends fully described data packets, which each contain information related to message sequence order, and routes these packets dynamically, allowing multiple packets to be transmitted essentially simultaneously.

Like the sequence diagram shown in FIGS. 6A and 6B, prior to receiving the CTS message, the sending node continues to send deterministically routed packets, thereby hiding the latency inherent in the RTS—CTS message exchange, and once the CTS message is received by the sending node, the sending node may transmit dynamically routed packets.

While the foregoing is directed to embodiments of the present invention, other and further embodiments of the invention may be devised without departing from the basic scope thereof, and the scope thereof is determined by the claims that follow.

What is claimed is:

1. A method of transmitting a message from a sending node to a receiving node of a parallel computing system, comprising:
   encapsulating the message within a set of one or more data packets;
   transmitting a request to send (RTS) message from the sending node to the receiving node;
   prior to receiving a clear to send (CTS) message at the sending node, transmitting one or more of the data packets to the receiving node, wherein the one or more data packets transmitted prior to receiving the CTS message at the sending node are one of deterministically routed packets and fully described, dynamically routed packets; and
   upon receiving the CTS message at the sending node, transmitting any remaining packets of the set of one or more packets to the receiving node, wherein the one or more data packets transmitted after receiving the CTS message at the sending node are routed dynamically, such that the one or more packets arrive in a different sequence order at the receiving node from a sequence order in which the one or more packets are transmitted, whereby the message is transmitted from the sending node to the receiving node.

2. The method of claim 1, wherein the RTS message comprises an initial fully described data packet interpreted by the receiving node to be the RTS message.

3. The method of claim 2, wherein the one or more data packets transmitted prior to receiving the CTS message at the sending node are deterministically routed such that each of the packets traverse an identical path from the sending node to the receiving node.

4. The method of claim 1, wherein the sending node and the receiving node are linked to one another via a network with a plurality of equally short paths between the sending node and receiving node.

5. A computer-readable storage medium containing a program which, when executed, performs an operation for transmitting a message from a sending node to a receiving node of a parallel computing system, comprising:
   encapsulating the message within a set of one or more data packets;
   transmitting a request to send (RTS) message from the sending node to the receiving node;
   prior to receiving a clear to send (CTS) message at the sending node, transmitting one or more of the data packets to the receiving node, wherein the one or more data packets transmitted prior to receiving the CTS message at the sending node are one of deterministically routed packets and fully described, dynamically routed packets; and
   upon receiving the CTS message at the sending node, transmitting any remaining packets of the set of one or more packets to the receiving node, wherein the one or more data packets transmitted after receiving the CTS message at the sending node are routed dynamically, such that the one or more packets arrive in a different sequence order at the receiving node from a sequence order in which the one or more packets are transmitted, whereby the message is transmitted from the sending node to the receiving node.

6. The computer-readable storage medium of claim 5, wherein the RTS message comprises an initial fully described data packet interpreted by the receiving node to be the RTS message.

7. The computer-readable storage medium of claim 6, wherein the one or more data packets transmitted prior to receiving the CTS message at the sending node are deterministically routed such that each of the packets traverse an identical path from the sending node to the receiving node.

8. The computer-readable storage medium of claim 5, wherein the sending node and the receiving node are linked to one another via a network with a plurality of equally short paths between the sending node and receiving node.

9. A parallel computing system, comprising:
   a plurality of compute nodes, each having at least one processor and a memory, wherein a sending node, of the plurality of compute nodes, is configured to transmit a message to a receiving node, of the plurality of compute nodes, by:
   encapsulating the message within a set of one or more data packets;
   transmitting a request to send (RTS) message from the sending node to the receiving node,
   prior to receiving a clear to send (CTS) message at the sending node, transmitting one or more of the data packets to the receiving node, wherein the one or more data packets transmitted prior to receiving the CTS message at the sending node are one of deterministically routed packets and fully described, dynamically routed packets; and, upon receiving the CTS message at the sending node, transmitting any remaining packets of the set of one or more packets to the receiving node, wherein the one or more data packets transmitted after receiving the CTS message at the sending node are routed dynamically, such that the one or more packets arrive in a different sequence order at the receiving node from a sequence order in which the one or more packets are transmitted, whereby the message is transmitted from the sending node to the receiving node.

10. The parallel computing system of claim 9, wherein the RTS message comprises an initial fully described data packet interpreted by the receiving node to be the RTS message.

11. The parallel computing system of claim 10, wherein the one or more data packets transmitted prior to receiving the CTS message at the sending node are deterministically routed such that each of the packets traverse an identical path from the sending node to the receiving node.

12. The parallel computing system of claim 9, wherein the sending node and the receiving node are linked to one another via a network with a plurality of equally short paths between the sending node and receiving node.

* * * * *